(12) United States Patent
Li

(10) Patent No.: US 11,327,929 B2
(45) Date of Patent: May 10, 2022

(54) METHOD AND SYSTEM FOR REDUCED DATA MOVEMENT COMPRESSION USING IN-STORAGE COMPUTING AND A CUSTOMIZED FILE SYSTEM

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 765 days.

(21) Appl. No.: 16/133,169

(22) Filed: Sep. 17, 2018

(65) Prior Publication Data

US 2020/0089784 A1    Mar. 19, 2020

(51) Int. Cl.
   *G06F 16/10*    (2019.01)
   *G06F 3/06*     (2006.01)
   *G06F 16/174*   (2019.01)
   *G06F 16/18*    (2019.01)

(52) U.S. Cl.
   CPC ........ *G06F 16/1744* (2019.01); *G06F 3/0608* (2013.01); *G06F 3/0643* (2013.01); *G06F 3/0655* (2013.01); *G06F 3/0679* (2013.01); *G06F 16/1815* (2019.01)

(58) Field of Classification Search
   CPC .................................................. G06F 16/1815
   See application file for complete search history.

(56) References Cited

U.S. PATENT DOCUMENTS

| 3,893,071 A | 7/1975  | Bossen |
| 4,562,494 A | 12/1985 | Bond   |
| 4,718,067 A | 1/1988  | Peters |

(Continued)

FOREIGN PATENT DOCUMENTS

| JP | 2003022209 | 1/2003 |
| JP | 2011175422 | 9/2011 |

(Continued)

OTHER PUBLICATIONS

C. Wu, D. Wu, H. Chou and C. Cheng, "Rethink the Design of Flash Translation Layers in a Component-Based View", in IEEE Acess, vol. 5, pp. 12895-12912, 2017.

(Continued)

*Primary Examiner* — Kristopher Andersen
(74) *Attorney, Agent, or Firm* — Shun Yao; Yao Legal Services, Inc.

(57) ABSTRACT

One embodiment facilitates data compression. During operation, the system receives, by a host computing device, a request to write a first set of data. The system writes the first set of data to a first storage device of a storage component. A storage component controller performs compression on the first set of data to obtain compressed data. The controller transmits, to a file system component of the host computing device, metadata associated with the compressed data. The file system component inserts in a journal an entry based on the metadata associated with the compressed data. The system writes, by the controller, the compressed data to a second storage device of the storage component, thereby enhancing performance of the host computing device by reducing a number of data transfers involved in compressing and writing of the first set of data.

20 Claims, 11 Drawing Sheets

(56) References Cited

U.S. PATENT DOCUMENTS

| | | | |
|---|---|---|---|
| 4,775,932 A | 10/1988 | Oxley | |
| 4,858,040 A | 8/1989 | Hazebrouck | |
| 5,394,382 A | 2/1995 | Hu | |
| 5,602,693 A | 2/1997 | Brunnett | |
| 5,715,471 A | 2/1998 | Otsuka | |
| 5,732,093 A | 3/1998 | Huang | |
| 5,802,551 A | 9/1998 | Komatsu | |
| 5,930,167 A | 7/1999 | Lee | |
| 6,098,185 A | 8/2000 | Wilson | |
| 6,148,377 A | 11/2000 | Carter | |
| 6,226,650 B1 | 5/2001 | Mahajan et al. | |
| 6,457,104 B1 | 9/2002 | Tremaine | |
| 6,658,478 B1 | 12/2003 | Singhal | |
| 6,795,894 B1 | 9/2004 | Neufeld | |
| 7,351,072 B2 | 4/2008 | Muff | |
| 7,565,454 B2 | 7/2009 | Zuberi | |
| 7,599,139 B1 | 10/2009 | Bombet | |
| 7,953,899 B1 | 5/2011 | Hooper | |
| 7,958,433 B1 | 6/2011 | Yoon | |
| 8,085,569 B2 | 12/2011 | Kim | |
| 8,144,512 B2 | 3/2012 | Huang | |
| 8,166,233 B2 | 4/2012 | Schibilla | |
| 8,260,924 B2 | 9/2012 | Koretz | |
| 8,281,061 B2 | 10/2012 | Radke | |
| 8,452,819 B1 | 5/2013 | Sorenson, III | |
| 8,516,284 B2 | 8/2013 | Chan | |
| 8,527,544 B1 | 9/2013 | Colgrove | |
| 8,751,763 B1 | 6/2014 | Ramarao | |
| 8,819,367 B1 | 8/2014 | Fallone | |
| 8,825,937 B2 | 9/2014 | Atkisson | |
| 8,832,688 B2 | 9/2014 | Tang | |
| 8,868,825 B1 | 10/2014 | Hayes | |
| 8,904,061 B1 | 12/2014 | O'Brien, III | |
| 9,015,561 B1 | 4/2015 | Hu | |
| 9,031,296 B2 | 5/2015 | Kaempfer | |
| 9,043,545 B2 | 5/2015 | Kimmel | |
| 9,088,300 B1 | 7/2015 | Chen | |
| 9,092,223 B1 | 7/2015 | Pani | |
| 9,129,628 B1 | 9/2015 | Fallone | |
| 9,141,176 B1 | 9/2015 | Chen | |
| 9,208,817 B1 | 12/2015 | Li | |
| 9,213,627 B2 | 12/2015 | Van Acht | |
| 9,280,472 B1 | 3/2016 | Dang | |
| 9,280,487 B2 | 3/2016 | Candelaria | |
| 9,311,939 B1 | 4/2016 | Malina | |
| 9,336,340 B1 | 5/2016 | Dong | |
| 9,436,595 B1 | 9/2016 | Benitez | |
| 9,495,263 B2 | 11/2016 | Pang | |
| 9,529,601 B1 | 12/2016 | Dharmadhikari | |
| 9,529,670 B2 | 12/2016 | O'Connor | |
| 9,569,454 B2 * | 2/2017 | Ebsen | G06F 16/185 |
| 9,575,982 B1 | 2/2017 | Sankara Subramanian | |
| 9,588,698 B1 | 3/2017 | Karamcheti | |
| 9,588,977 B1 | 3/2017 | Wang | |
| 9,607,631 B2 | 3/2017 | Rausch | |
| 9,671,971 B2 | 6/2017 | Trika | |
| 9,747,202 B1 | 8/2017 | Shaharabany | |
| 9,852,076 B1 | 12/2017 | Garg | |
| 9,875,053 B2 | 1/2018 | Frid | |
| 9,912,530 B2 | 3/2018 | Singatwaria | |
| 9,946,596 B2 | 4/2018 | Hashimoto | |
| 10,013,169 B2 | 7/2018 | Fisher | |
| 10,199,066 B1 | 2/2019 | Feldman | |
| 10,229,735 B1 | 3/2019 | Natarajan | |
| 10,235,198 B2 | 3/2019 | Qiu | |
| 10,268,390 B2 | 4/2019 | Warfield | |
| 10,318,467 B2 | 6/2019 | Barzik | |
| 10,361,722 B2 | 7/2019 | Lee | |
| 10,437,670 B1 | 10/2019 | Koltsidas | |
| 10,459,663 B2 | 10/2019 | Agombar | |
| 10,642,522 B2 | 5/2020 | Li | |
| 10,649,657 B2 | 5/2020 | Zaidman | |
| 10,678,432 B1 | 6/2020 | Dreier | |
| 10,756,816 B1 | 8/2020 | Dreier | |
| 10,928,847 B2 | 2/2021 | Suresh | |
| 2001/0032324 A1 | 10/2001 | Slaughter | |
| 2002/0010783 A1 | 1/2002 | Primak | |
| 2002/0039260 A1 | 4/2002 | Kilmer | |
| 2002/0073358 A1 | 6/2002 | Atkinson | |
| 2002/0095403 A1 | 7/2002 | Chandrasekaran | |
| 2002/0112085 A1 | 8/2002 | Berg | |
| 2002/0161890 A1 | 10/2002 | Chen | |
| 2003/0145274 A1 | 7/2003 | Hwang | |
| 2003/0163594 A1 | 8/2003 | Aasheim | |
| 2003/0163633 A1 | 8/2003 | Aasheim | |
| 2003/0217080 A1 | 11/2003 | White | |
| 2004/0010545 A1 | 1/2004 | Pandya | |
| 2004/0066741 A1 | 4/2004 | Dinker | |
| 2004/0103238 A1 | 5/2004 | Avraham | |
| 2004/0255171 A1 | 12/2004 | Zimmer | |
| 2004/0267752 A1 | 12/2004 | Wong | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0138325 A1 | 6/2005 | Hofstee | |
| 2005/0144358 A1 | 6/2005 | Conley | |
| 2005/0149827 A1 | 7/2005 | Lambert | |
| 2005/0174670 A1 | 8/2005 | Dunn | |
| 2005/0177672 A1 | 8/2005 | Rao | |
| 2005/0177755 A1 | 8/2005 | Fung | |
| 2005/0195635 A1 | 9/2005 | Conley | |
| 2005/0235067 A1 | 10/2005 | Creta | |
| 2005/0235171 A1 | 10/2005 | Igari | |
| 2006/0031709 A1 | 2/2006 | Hiraiwa | |
| 2006/0101197 A1 | 5/2006 | Georgis | |
| 2006/0156012 A1 | 7/2006 | Beeson | |
| 2006/0184813 A1 | 8/2006 | Bui | |
| 2007/0033323 A1 | 2/2007 | Gorobets | |
| 2007/0061502 A1 | 3/2007 | Lasser | |
| 2007/0101096 A1 | 5/2007 | Gorobets | |
| 2007/0250756 A1 | 10/2007 | Gower | |
| 2007/0266011 A1 | 11/2007 | Rohrs | |
| 2007/0283081 A1 | 12/2007 | Lasser | |
| 2007/0283104 A1 | 12/2007 | Wellwood | |
| 2007/0285980 A1 | 12/2007 | Shimizu | |
| 2008/0034154 A1 | 2/2008 | Lee | |
| 2008/0065805 A1 | 3/2008 | Wu | |
| 2008/0082731 A1 | 4/2008 | Karamcheti | |
| 2008/0112238 A1 | 5/2008 | Kim | |
| 2008/0163033 A1 | 7/2008 | Yim | |
| 2008/0301532 A1 | 12/2008 | Uchikawa | |
| 2009/0006667 A1 | 1/2009 | Lin | |
| 2009/0089544 A1 | 4/2009 | Liu | |
| 2009/0113219 A1 | 4/2009 | Aharonov | |
| 2009/0125788 A1 | 5/2009 | Wheeler | |
| 2009/0183052 A1 | 7/2009 | Kanno | |
| 2009/0254705 A1 * | 10/2009 | Abali | G06F 12/0897 711/117 |
| 2009/0282275 A1 | 11/2009 | Yermalayeu | |
| 2009/0287956 A1 | 11/2009 | Flynn | |
| 2009/0307249 A1 | 12/2009 | Koifman | |
| 2009/0307426 A1 | 12/2009 | Galloway | |
| 2009/0310412 A1 | 12/2009 | Jang | |
| 2010/0169470 A1 | 7/2010 | Takashige | |
| 2010/0217952 A1 | 8/2010 | Iyer | |
| 2010/0229224 A1 | 9/2010 | Etchegoyen | |
| 2010/0325367 A1 | 12/2010 | Kornegay | |
| 2010/0332922 A1 | 12/2010 | Chang | |
| 2011/0031546 A1 | 2/2011 | Uenaka | |
| 2011/0055458 A1 | 3/2011 | Kuehne | |
| 2011/0055471 A1 | 3/2011 | Thatcher | |
| 2011/0060722 A1 | 3/2011 | Li | |
| 2011/0099418 A1 | 4/2011 | Chen | |
| 2011/0153903 A1 | 6/2011 | Hinkle | |
| 2011/0161784 A1 | 6/2011 | Selinger | |
| 2011/0191525 A1 | 8/2011 | Hsu | |
| 2011/0218969 A1 | 9/2011 | Anglin | |
| 2011/0231598 A1 | 9/2011 | Hatsuda | |
| 2011/0239083 A1 | 9/2011 | Kanno | |
| 2011/0252188 A1 | 10/2011 | Weingarten | |
| 2011/0258514 A1 | 10/2011 | Lasser | |
| 2011/0289263 A1 | 11/2011 | Mcwilliams | |
| 2011/0289280 A1 | 11/2011 | Koseki | |
| 2011/0292538 A1 | 12/2011 | Haga | |

(56) References Cited

U.S. PATENT DOCUMENTS

| | | |
|---|---|---|
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D'Abreu |
| 2013/0254622 A1 | 9/2013 | Kanno |
| 2013/0318283 A1 | 11/2013 | Small |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1* | 3/2016 | Ryu ............... G06F 12/0246 711/103 |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |

(56) References Cited

U.S. PATENT DOCUMENTS

| | | |
|---|---|---|
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1* | 7/2019 | Pletka .................. G06F 3/0688 |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |

FOREIGN PATENT DOCUMENTS

| | | |
|---|---|---|
| WO | 9418634 | 8/1994 |
| WO | 1994018634 | 8/1994 |

OTHER PUBLICATIONS

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Jimenex, X., Novo, D. and P. Ienne, "Pheonix:Reviving MLC Blocks as SLC to Extend NAND Flash Devices Lifetime, "Design, Automation & Text in Europe Conference & Exhibition (DATE), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

https://web.archive.org/web/20071130235034/http://en.wikipedia.org:80/wiki/logical_block_addressing Wikipedia screen shot retriefed on wayback Nov. 20, 2007 showing both physical and logical addressing used historically to access data on storage devices (Year: 2007).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST '11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

Te I et al. (Pensieve: a Machine Assisted SSD Layer for Extending the Lifetime: (Year: 2018).

(56) References Cited

OTHER PUBLICATIONS

ARM ("Cortex-R5 and Cortex-R5F", Technical reference Manual, Revision r1p1) (Year:2011).

* cited by examiner

METHOD AND SYSTEM FOR REDUCED DATA MOVEMENT COMPRESSION USING IN-STORAGE COMPUTING AND A CUSTOMIZED FILE SYSTEM

BACKGROUND

Field

This disclosure is generally related to the field of data storage. More specifically, this disclosure is related to a method and system for reduced data movement compression using in-storage computing and a customized file system.

Related Art

The proliferation of the Internet and e-commerce continues to create a vast amount of digital content, e.g., via applications. Various storage systems and servers have been created to access and store such digital content. A storage system or server usually provides a certain amount of redundancy, which can be realized via compression and can result in a savings in storage space. Because software-based compression can result in suboptimal efficiency, one solution is to offload the compression to the hardware to accelerate or increase the performance. As a first example, compression may be offloaded to a dedicated Peripheral Component Interconnect Express (PCIe) card, which requires several passes through the PCIe bus, e.g.: 1) the data to be compressed travels from the host dual in-line memory module (DIMM) where the raw data sits, and is transferred through the PCIe bus to the dedicated PCIe card; 2) the dedicated PCIe card compresses the data, and transfers the compressed data from the PCIe card via the PCIe bus back to the host-side file system for post-compression processing and re-formatting; and 3) the host transfers the compressed data via the PCIe bus back to a PCIe Solid State Drive (SSD) for storage. In this situation, the data must be transferred three times through the PCIe bus, which can increase both the latency and the traffic over the PCIe bus.

As a second example, compression may be offloaded to a smart Network Interface Card (NIC), e.g., in handling remote traffic arriving from other nodes when the NIC is in the data path. However, a similar problem exists for the NIC as does for the dedicated PCIe compression card. That is, the data must be transferred three times through the PCIe bus: 1) the data is sent to the NIC through the PCIe bus; 2) the NIC performs the compression and subsequently transfers the compressed data from the NIC via the PCIe bus back to the host for re-formatting; and 3) the host transfers the compressed data via the PCIe bus to the PCIe SSD for storage.

As a third example, compression can be performed inside the SSD controller, but similar to the two prior examples, the SSD controller must still return the compressed data to the host. Thus, the data is still transferred three time: 1) the data is sent to the SSD through the PCIe bus; 2) the SSD controller performs the compression and subsequently transfers the compressed data viai the PCIe bus back to the host for re-formatting; and 3) the host transfers the compressed data via the PCIe bus to the PCIe SSD for storage.

As a fourth example, compression may be performed by the Central Processing Unit (CPU), which can process the compressed files via a host-side file system, and transfer the compressed data to the PCIe SSD. However, the CPU must still finish formatting and processing on the compressed data, and because the file system still sits on the host-side, the data must still travel via the PCIe bus multiple times.

One drawback of these examples (dedicated PCIe compression card, smart NIC compression, SSD controller compression, and CPU compression) is the significant amount of data movement. If the amount of data to be stored increases, a large amount of data (e.g., on the order of tens of Terabytes) may be transferred. For a write operation, the large amount of data must be transferred into the compression card to be compressed (via the PCIe bus), and then transferred out of the compression card to be written into the storage drives (again via the PCIe bus). For a read operation, the data is first read into the compression card from the storage drive (via the PCIe bus), and then transferred out to the host (again via the PCIe bus). These operations can result in a high amount of traffic on the PCIe bus. Given the limited PCIe resources in a storage server, and the lower throughput of the PCIe bus (as compared to, e.g., the memory bus), this can result in an inefficient system. That is, when the limited bandwidth and throughput of the PCIe bus is spent on handling/processing the background data related to compression, the overall storage system can experience a decrease in performance. The consumption of the PCIe bandwidth can result in an increased latency, which can decrease the overall performance of the storage system.

Yet another drawback of the fourth example (CPU compression) is that the compression occurs at the file level. However, conventional drive-level compression occurs at the small I/O level, e.g., 4 KB. Thus, each compression can only reduce the redundancy based on each small I/O block (e.g., 4 KB), which can result in an overall compression ratio which is worse than the global compression at the file level.

Thus, while data compression is useful in storage systems, the issues of significant data movement, decreased bandwidth, increased latency, decreased performance, traffic bottleneck, and reduced efficiency are some issues which remain unsolved

SUMMARY

One embodiment facilitates data compression. During operation, the system receives, by a host computing device, a request to write a first set of data. The system writes the first set of data to a first storage device of a storage component. The first storage device can include a volatile memory, and can reside on the host computing device. The system performs, by a controller of the storage component, compression on the first set of data to obtain compressed data. The system transmits, by the controller to a file system component of the host computing device, metadata associated with the compressed data. The system inserts, in a journal by the file system component, an entry based on the metadata associated with the compressed data. The system writes, by the controller, the compressed data to a second storage device of the storage component, thereby enhancing performance of the host computing device by reducing a number of data transfers involved in compressing and writing of the first set of data.

In some embodiments, the system writes, by the host computing device, a plurality of uncompressed files to a volatile memory of the host computing device. The system combines, by the file system component, the plurality of uncompressed files. The system concatenates, by the file system component, metadata for the combined files. The system writes, by the file system component, the concatenated metadata in the journal based on a format of the concatenated metadata. The system writes the uncompressed files to the first storage device of the storage component.

In some embodiments, subsequent to performing, by the storage component controller, compression on the first set of data to obtain the compressed data, the system compares metadata of the compressed data to metadata of the first set of data to determine an amount of compression gain. Transmitting the metadata associated with the compressed data, inserting the entry in the journal, and writing the compressed data to the second storage device of the storage component are in response to determining that the amount of compression gain is greater than a predetermined threshold. In response to determining that the amount of compression gain is not greater than the predetermined threshold, the system writes the first set of data to the second storage device of the storage component.

In some embodiments, the system exposes the first storage device of the storage component to the host computing device, which allows the host computing device to write the first set of data or the compressed data to the first storage device of the storage component In some embodiments, in response to detecting a condition which triggers compaction of the journal, the system updates the journal by replacing out-of-date versions of metadata entries associated with a file with a most recent version of a metadata entry for the file.

In some embodiments, the condition which triggers compaction of the journal is based on one or more of: whether a current size of the journal is greater than a predetermined size; and whether a predetermined time interval has passed.

In some embodiments, the system receives, by the host computing device, a request to read a second set of data. The system identifies, by the file system component in the journal, metadata associated with the second set of data. In response to determining, based on the identified metadata, that the second set of data is stored as compressed data, the system: loads the compressed data corresponding to the second set of data from the second storage device of the storage component to the first storage device of the storage component; and extracts, by the controller, the second set of data by performing decompression on the compressed data corresponding to the second set of data. In response to determining, based on the identified metadata, that the second set of data is not stored as compressed data, the system reads the second set of data from the second storage device of the storage component. The system transmits the requested second set of data to the host computing device.

In some embodiments: the storage component is a solid state drive (SSD); the first storage device of the storage component is an internal volatile memory which includes a dynamic random access memory (DRAM) buffer; the second storage device is a non-volatile memory; the compression is performed by a microprocessor of the SSD controller; and the first set of data is written to the internal DRAM buffer of the SSD via a Peripheral Component Interconnect Express (PCIe) bus.

BRIEF DESCRIPTION OF THE FIGURES

In the figures, like reference numerals refer to the same figure elements.

DETAILED DESCRIPTION

Figure 1A:
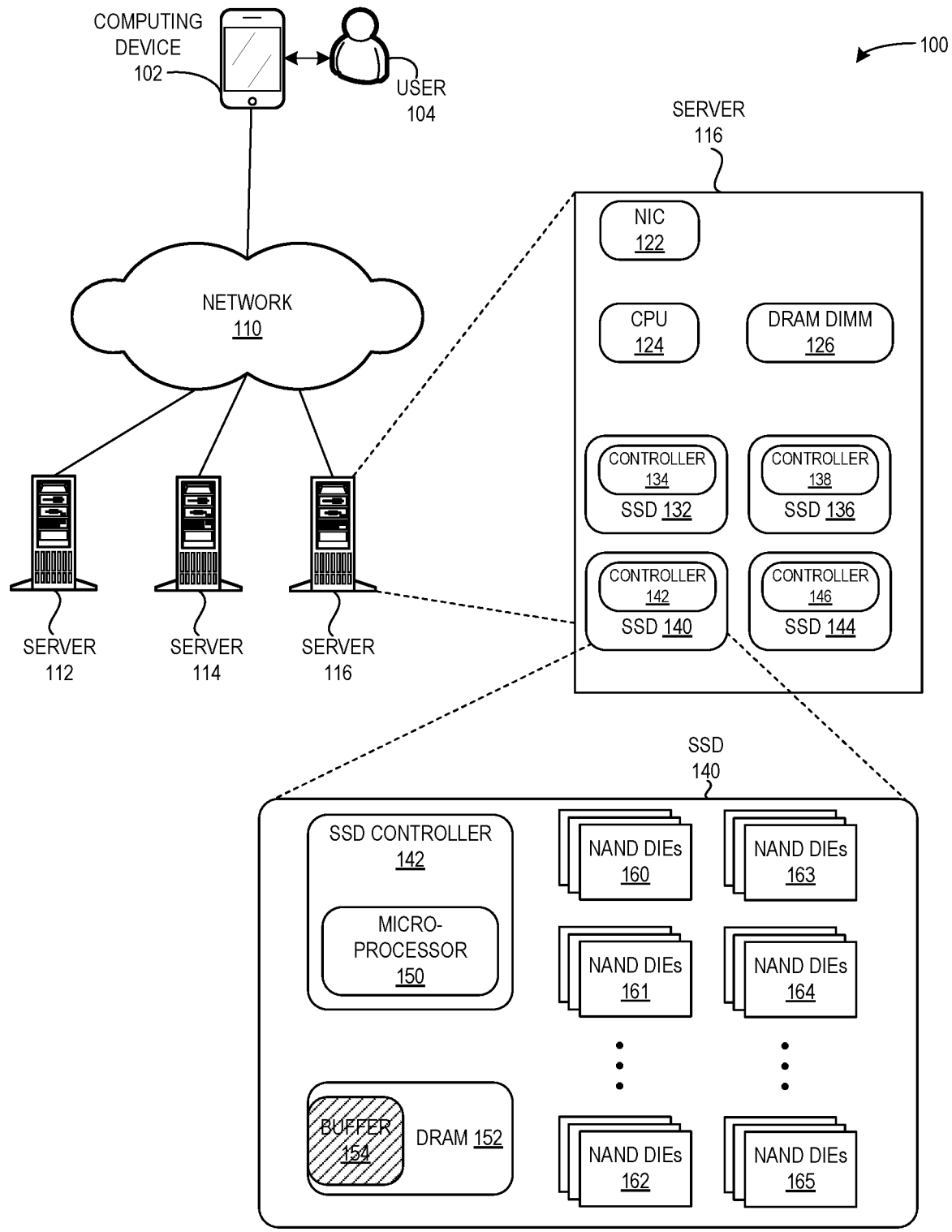
FIG. 1A illustrates an exemplary environment that facilitates data compression with reduced data transfers, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problems of performance inefficiency in data compression and storage by providing a system which uses: a storage drive's volatile memory (e.g., DRAM) to store uncompressed data; the storage drive's microprocessor to perform compression; and a customized file system which accumulates and compacts metadata file entries in the journal log.

Conventional compression systems include, e.g., a dedicated PCIe compression card, smart NIC compression, SSD controller compression, and CPU compression. However, as described above, these conventional systems result in multiple passes of the (uncompressed and compressed) data across the PCIe bus. When moving large amounts of data, this can result in decreased bandwidth, increased latency, decreased performance, traffic bottleneck, and reduced efficiency of the storage system (or storage server).

The embodiments described herein address these problems by exposing the DRAM in the SSD as a memory buffer which can be accessed by the host via the memory buffer of the controller. Rather than placing the uncompressed data in the DIMM of the server (as in the conventional systems), the embodiments described herein place the uncompressed data in the internal DRAM of the SSD. Thus, the uncompressed data is held physically inside the SSD, which is physically close to the NAND flash where the compressed data is to be stored. The uncompressed data is also physically close to the SSD controller, which has multiple microprocessors that may be used to perform compression. The SSD controller can access the data stored in its internal DRAM via the DRAM controller, such that after the data is successfully moved from the host to the SSD DRAM, one of the SSD microprocessors can execute a firmware program to compress the data. The SSD controller can then write the compressed data to the NAND flash. At the same time, the SSD controller can send metadata about the compressed file (e.g., "brief information" such as the length and the size of the compressed data) back to the host file system. These operations by the SSD controller (e.g., accessing data in the SSD internal DRAM, performing compression on the accessed data, and sending the brief information or metadata) can be referred to as "in-storage computing."

The host file system can use the brief information (which is itself metadata associated with the compressed file) to update, in its journal log, metadata associated with the file. The host file system can also run a journal compaction, which removes any outdated metadata entries associated with the file. Compacting metadata entries in a journal log is described below in relation to FIG. 4.

Thus, in the embodiments described herein, the uncompressed data travels only once through the PCIe bus (from the host to the SSD DRAM), and after the compression by the SSD controller's microprocessor, only the brief information (i.e., the metadata of the compressed file) is sent back to the customized file system, which maintains, updates, and compacts metadata entries for the file in its journal log. By eliminating the additional passes of the data through the PCI bus (i.e., reducing the amount of data transferred between the host and the SSD), the system can reduce the consumption of the PCIe bandwidth and reduce any associated traffic bottleneck. This in turns can result in a decreased latency and an increased performance for the overall storage system.

Thus, the embodiments described herein provide a system which improves the efficiency and performance of a storage system. By allowing the host to access the internal DRAM of the SSD, and by managing the metadata and compaction of the journal at the file system on the host, the system reduces the number of data transfers across the PCIe bus. The decreased amount of traffic can increase the efficiency of the storage system, and can also result in an improvement in the bandwidth and latency of the storage system. The embodiments described herein provide a technological solution (e.g., utilizing the SSD's internal DRAM, and managing metadata and journal compaction by the host file system) to a technological problem in the software arts (e.g., increasing the efficiency and performance of a storage system). The system described herein is also rooted in computer technology (e.g., data compression and storage), and directed to an improvement in computer functionality (e.g., increasing the bandwidth and decreasing the latency in a storage system).

Exemplary Environment and Network; Comparison with Prior Art

FIG. 1A illustrates an exemplary environment 100 that facilitates data compression with reduced data transfers, in accordance with an embodiment of the present application. Environment 100 can include a computing device 102 and an associated user 104. Computing device 102 can communicate via a network 110 with storage servers 112, 114, and 116, which can be part of a distributed storage system and accessed via client servers (not shown). A storage server can include multiple storage drives, and each drive can include a controller and multiple physical media for data storage. For example, server 116 can include a network interface card (NIC) 122, a CPU 124, a DRAM DIMM 126, and SSDs 132, 136, 140, and 144 with, respectively, controllers 134, 138, 142, and 146.

Specifically, SSD 140 can include SSD controller 142, which can include one or more microprocessors (e.g., a microprocessor 150). SSD 140 can also include an internal DRAM 152, with a specific buffer 154 which can be exposed to the host as additional memory space. SSD 140 can also include a NAND management module (not shown), which can communicate with NAND dies 160-165. This is a high-level overview of the embodiments described herein. An exemplary environment that facilitates data compression with reduced data transfers is described below in relation to FIG. 1B.

Figure 2:
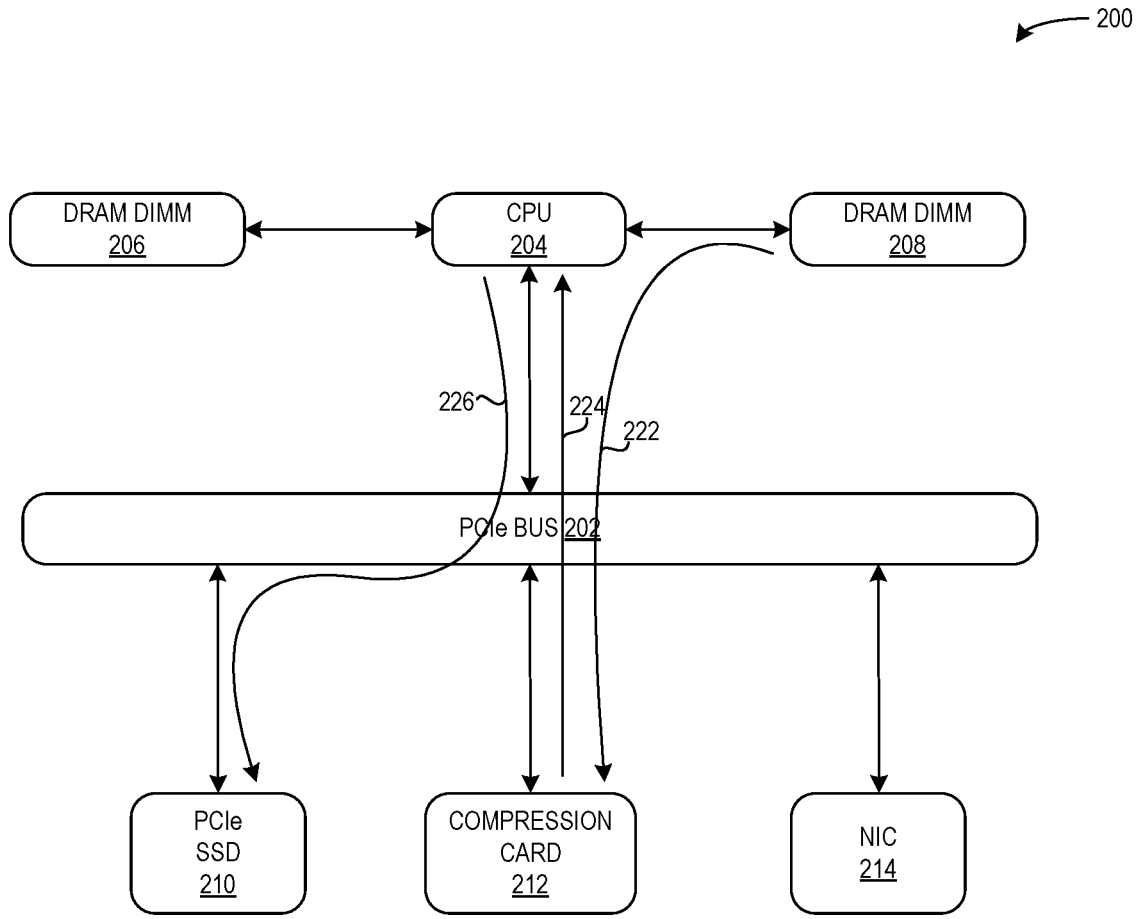
FIG. 2 illustrates an exemplary environment with data compression and data transfers, in accordance with the prior art.

In comparison to the conventional storage servers in the prior art, the embodiments described herein can enhance the efficiency of a storage system. FIG. 2 illustrates an exemplary environment 200 with data compression and data transfers, in accordance with the prior art. Environment 200 can represent a storage server or other computing device with non-volatile memory storage. The storage server can include DRAM DIMMs 206 and 208 and a CPU 204, which can communicate via a PCIe bus 202 with a PCIe SSD 210, a compression card 212, and a NIC 214. During operation, data to be written can be stored in the volatile memory (e.g., DRAM DIMM 208). The system transfers or moves the data via PCIe bus 202 to compression card 212 (e.g., a transfer 222). Compression card 212 can execute compression on the transferred data, and can send the compressed data back via PCIe bus 202 to CPU 204 (e.g., a transfer 224). CPU 204 can perform the relevant processing and formatting of the compressed data, and can subsequently send the compressed data via PCIe bus 202 to PCIe SSD 210 to be written to the NAND (e.g., a transfer 226). Thus, the data must travel across PCIe bus 202 three separate times (i.e., transfers 222, 224, and 226). This significant amount of data movement can result in decreased bandwidth, increased latency, and a traffic bottleneck, which can in turn result in a decreased performance and reduced efficiency in the storage server and in the overall storage system.

Figure 1B:
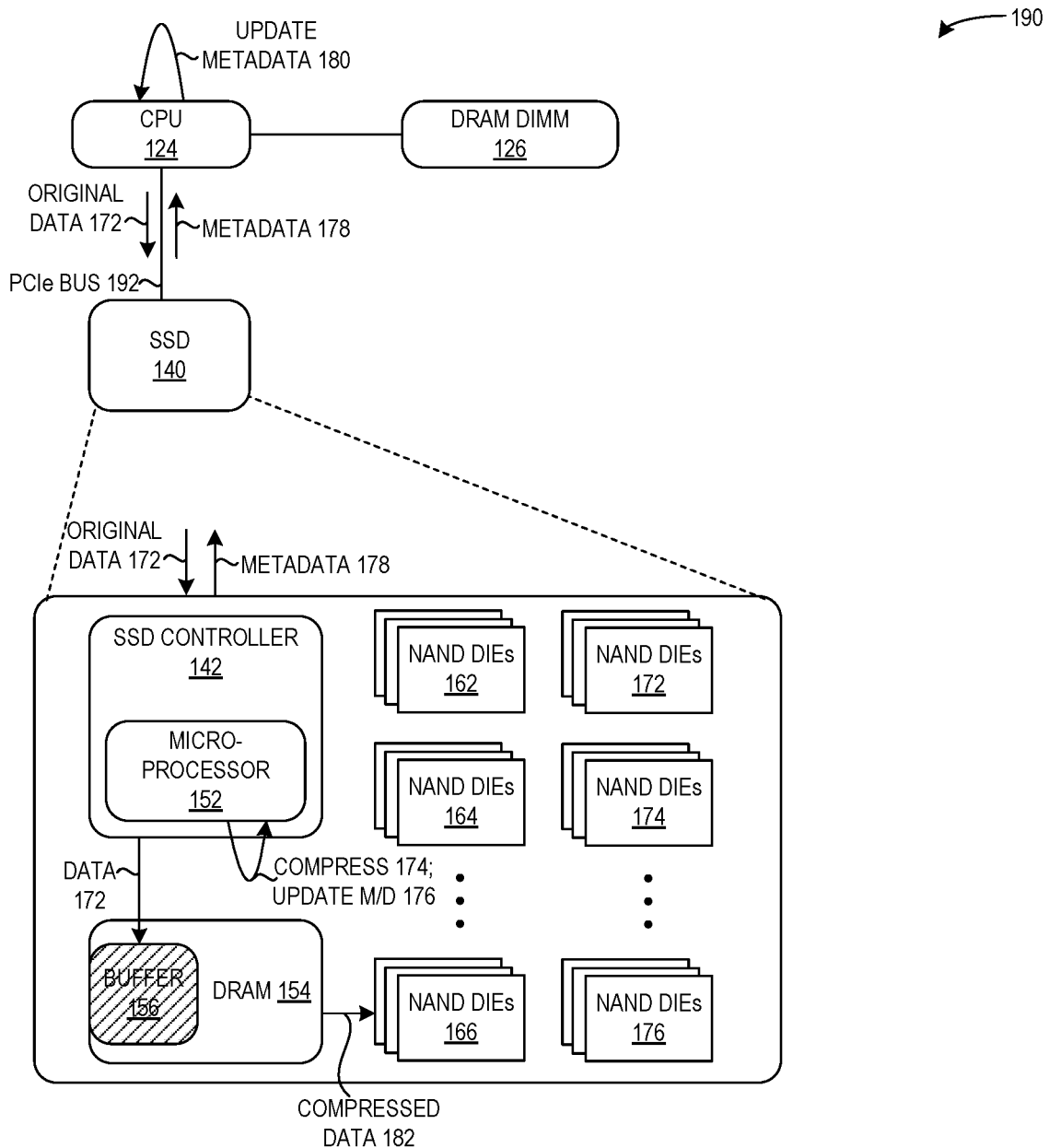
FIG. 1B illustrates an exemplary environment that facilitates data compression with reduced data transfers, in accordance with an embodiment of the present application.

The embodiments described herein solve these performance and efficiency problems by providing a system which improves data compression by reducing the movement of data across the PCIe bus. FIG. 1B illustrates an exemplary environment 190 that facilitates data compression with reduced data transfers, in accordance with an embodiment of the present application. During communication, CPU 124 can send original data 172 (i.e., the uncompressed data which is to be subsequently compressed and written to a non-volatile storage) from DRAM DIMM 126 via a PCIe bus 192 to SSD 140. Upon receiving original data 172, SSD controller 142 can place data 172 in its internal DRAM buffer (i.e., a buffer 156 of DRAM 154). SSD controller 142 can, by a microprocessor 152, access original data 172 in buffer 156 and execute compression on original data 172 (compress 174 function, to obtain compressed data 182), and can also determine and update the metadata associated with the compressed data (update metadata 176 function, to obtain metadata 178). SSD controller 142 can subsequently send metadata 178 via PCIe bus 192 back to CPU 124, which can subsequently perform a simple update metadata 180 function in its journal log. An exemplary journal log is described below in relation to FIG. 4. The system can also access compressed data 182 in buffer 156, and send compressed data 182 to non-volatile storage (e.g., NAND dies 166).

Thus, the data itself only travels once across the PCIe bus as original data 172, in contrast to the three times across the PCIe bus in the conventional systems described in FIG. 2. Furthermore, the system need only return metadata 178 back to CPU 124, and metadata 178 can include only brief information regarding the actual metadata associated with the compressed file. The brief information can include a size, a length, and/or an offset of the compressed file (e.g., compressed data 182), and can be used by CPU 124 in turn to update its journal log entry.

Exemplary File System; Exemplary Compaction of Metadata in Journal

Figure 3:
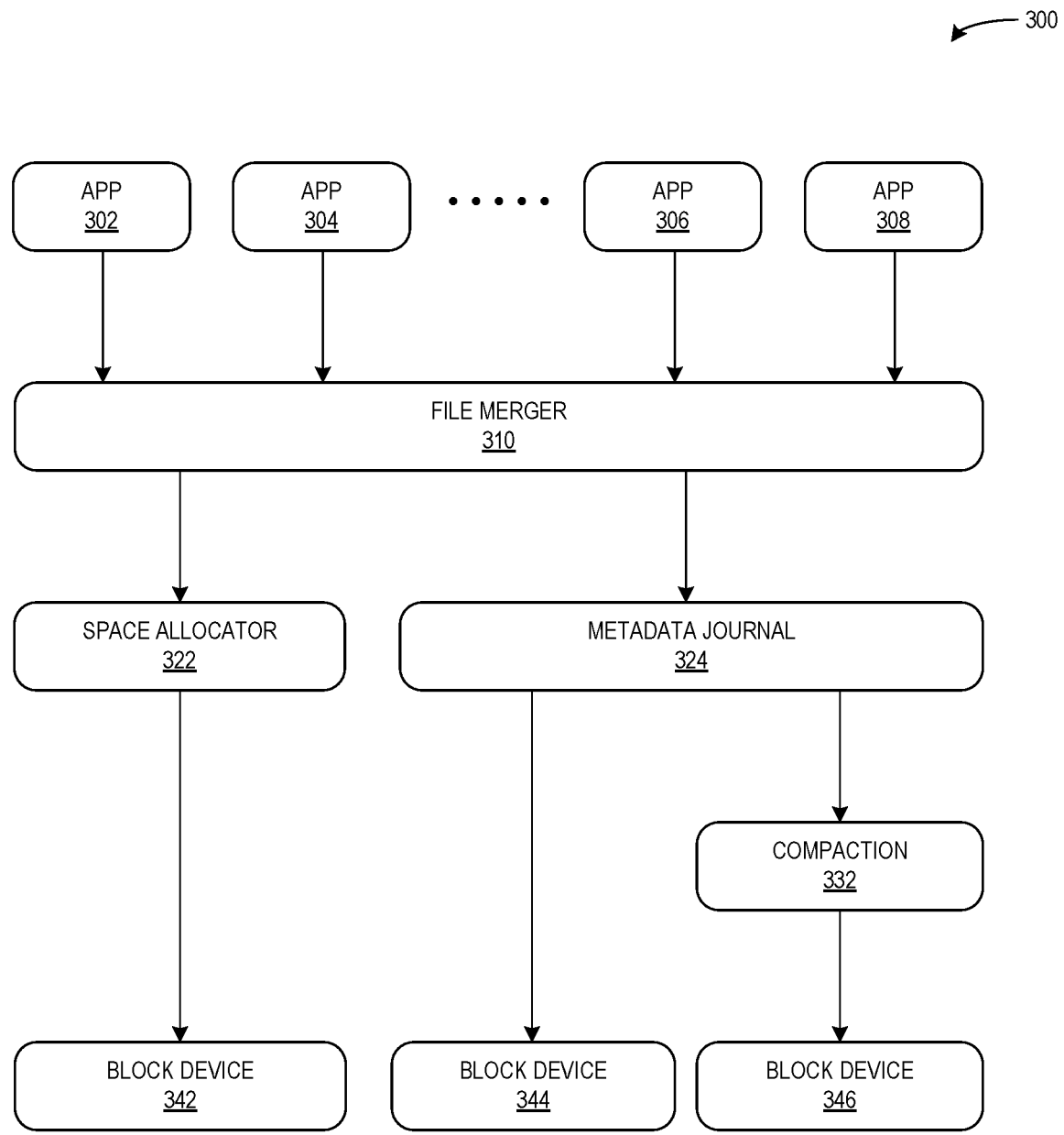
FIG. 3 illustrates a customized file system environment which facilitates data compression with reduced data transfers, in accordance with an embodiment of the present application.

FIG. 3 illustrates a customized file system environment 300 which facilitates data compression with reduced data transfers, in accordance with an embodiment of the present application. Environment 300 can include multiple applications (e.g., applications 302, 304, 306, and 308) which can send data to a file merger 310 component. File merger 310 can merge incoming files into data blocks of varying sizes. The data block is generally larger than one size threshold. File merger 310 can pack the files sequentially, generate the relevant metadata for the packed files, and write the generated metadata to a metadata journal 324. A space allocator 322 can request a physical location in the NAND flash to which to write the packed files. The system can synchronize the metadata written to a block device (e.g., blocks device 342, 344, and 346) by calling the "sync" function. At the same time, the metadata in metadata journal 324 can be compacted by a compaction 332 module when the size of the metadata journal exceeds a predetermined threshold for capacity. For example, if the journal accumulates more than 8 MB of metadata, the system can trigger compaction 332 to remove (or invalidate) the out-of-date metadata. When one piece of metadata is removed during compaction, the corresponding data is also trimmed. An exemplary journal log with compaction (i.e., 324 and 332) is described below in relation to FIG. 4.

After an incoming data file is compressed (by the SSD microprocessor, as shown above in relation to FIG. 1B), the SSD controller sends only the brief information about the compressed file (such as the length and the size) to the file system, which can take the brief information and update its metadata journal log (324) entry associated with the compressed file. Compaction 332 may be triggered upon detecting that a size of the journal log has exceeded the predetermined threshold for capacity.

Figure 4:
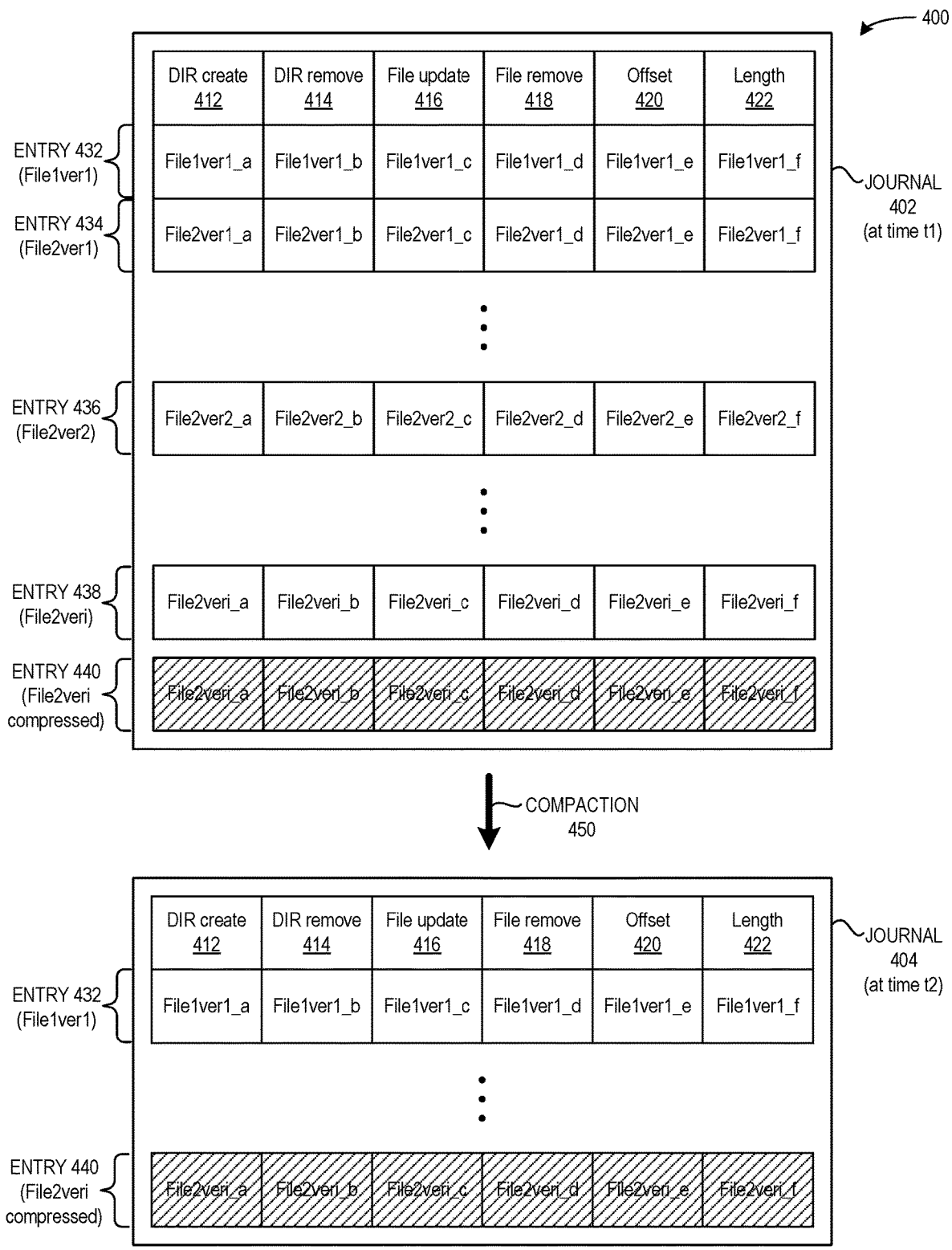
FIG. 4 illustrates an exemplary journal log with metadata entries and compaction in a customized file system that facilitates data compression with reduced data transfers, in accordance with an embodiment of the present application.

FIG. 4 illustrates an exemplary journal log environment 400 with metadata entries and compaction in a customized file system that facilitates data compression with reduced data transfers, in accordance with an embodiment of the present application. Environment 400 can include a journal 402 at a time t1 and a journal 404 at a time t2, which is subsequent to time t1. Journal 402 can include row entries with the following columns: a DIR create 412; a DIR remove 414; a file update 416; a file remove 418; an offset 420; and a length 422. Each row in journal 402 can correspond to the metadata for a specific file and a specific version of that specific file. For example, an entry 432 for "File1ver1" can include the following information, corresponding respectively to columns 412-422: "File1ver1_a"; "File1ver1_b"; "File1ver1_c"; "File1ver1_d"; "File1ver1_e"; and "File1ver1_f." Similarly, an entry 434 for "File2ver1" can include the following information: "File2ver1_a"; "File2ver1_b"; "File2ver1_c"; "File2ver1_d"; "File2ver1_e"; and "File2ver1_f." The system can continue to write additional rows to journal 402 whenever an update is made to the corresponding file. For example, entry 436 can include metadata corresponding to "File2ver2" and entry 438 can include metadata corresponding to "File2veri."

Entries 434, 436, and 438 may have been written to journal 402 before the corresponding file was compressed. Recall that when the corresponding file is compressed (e.g., by microprocessor 152 of FIG. 1B), the brief information (e.g., metadata 178) is sent back to the CPU. Upon receiving the brief information, the host file system can update the corresponding entry in its journal log (e.g., update metadata 180 function of FIG. 1B and metadata journal 324 component of FIG. 3). To update the corresponding entry, the host file system simply writes the associated metadata for that version to a new row, as shown in an entry 440 for "File2veri compressed." The compressed metadata is indicated with diagonally slanting lines.

The system can determine a condition which triggers compaction of the journal. For example, if the system detects that the size of journal 402 has exceeded, e.g., 8 MB, the system can perform a compaction 450 function, whereby the system removes (i.e., deletes, invalidates, or frees) the out-of-date entries or the entries for older versions of a particular file. Journal 404 includes the contents of the journal log at time t2 after compaction 450 has occurred. Out-of-date entries 434, 436, and 438 have been deleted from journal 404, and the space previously used by those out-of-date entries has been freed up. The only remaining entry corresponding to "File2" is entry 440, which includes the compressed data for the most recent version of File2 (i.e., "File2veri compressed").

Therefore, instead of transferring the entire compressed file via the PCIe bus back to the file system for re-formatting and processing (as in the conventional systems, and data transfer 224 of FIG. 2), the embodiments described herein need only send the brief information of the compressed file to the file system, which allows the file system to update it metadata journal log, which log is subsequently automatically compacted based on the predetermined threshold.

Figure 5A:
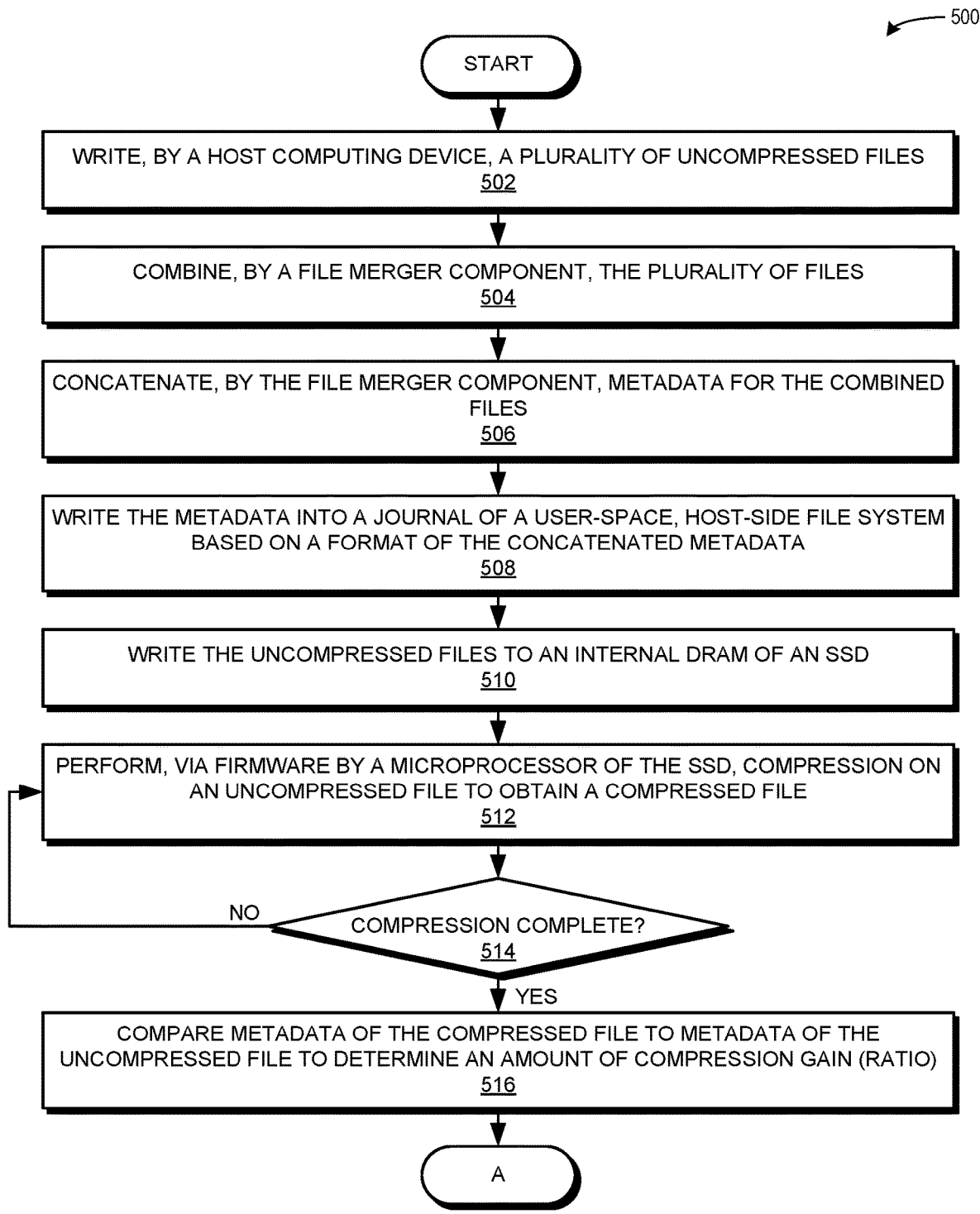
FIG. 5A presents a flowchart illustrating a method for facilitating data compression with reduced data transfers, including a write operation, in accordance with an embodiment of the present application.

Method for Facilitating Data Compression with Reduced Data Transfers: A Write Operation FIG. 5A presents a flowchart 500 illustrating a method for facilitating data compression with reduced data transfers, including a write operation, in accordance with an embodiment of the present application. During operation, the system receives, by a host computing device, a request to write a first set of data, such as a plurality of uncompressed files. That is, the host computing device writes a plurality of uncompressed files (operation 502). The system combines, by a file merger component of the host computing device, the plurality of files (operation 504). The system concatenates, by the file merger component, metadata for the combined files (operation 506). The system writes the metadata into a journal of a user-space host-side file system (e.g., by a file system component) based on a format of the concatenated metadata (operation 508). The system, by the host computing device, writes the uncompressed files to an internal DRAM of an SSD (operation 510). That is, the system writes the first set of data to a "first storage device" (e.g., a volatile memory like DRAM) of a storage component (SSD) residing on the host computing device. For example, the system exposes the internal DRAM of the SSD to the host computing device, which allows the host computing device to use the SSD DRAM as additional host memory space, even though the SSD DRAM is located physically on the SSD and not on the DRAM DIMM of the host computing device.

The system performs, via firmware by a microprocessor of the SSD, compression on an uncompressed file to obtain a compressed file (operation 512). That is, a controller of the storage component performs compression on the first set of data to obtain compressed data. If the compression is not complete (decision 514), the operation continues at operation 512. If the compression is complete (decision 514), the system compares metadata of the compressed file to metadata of the uncompressed file to determine an amount of compression gain (ratio) (operation 516), and the operation continues at Label A of FIG. 5B. The compression gain can be expressed as a ratio of, e.g., a size of the compressed file to a size of the uncompressed file.

Figure 5B:
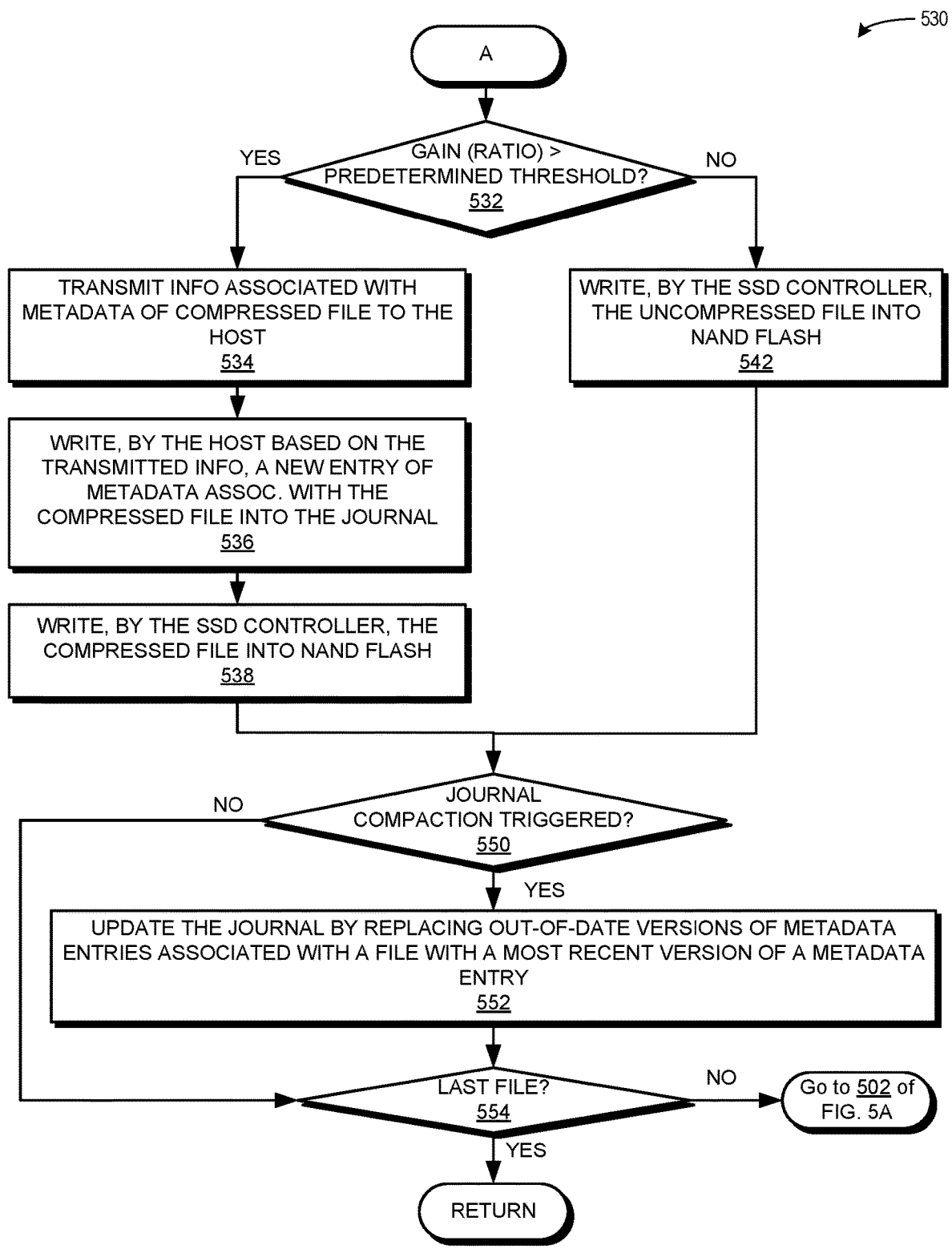
FIG. 5B presents a flowchart illustrating a method for facilitating data compression with reduced data transfers, including a write operation, in accordance with an embodiment of the present application.

FIG. 5B presents a flowchart 530 illustrating a method for facilitating data compression with reduced data transfers, including a write operation, in accordance with an embodiment of the present application. During operation, if the system determines that the amount of compression gain (ratio) is greater than a predetermined threshold (decision 532), the system transmits information associated with the metadata of the compressed file to the host computing device (operation 534) (e.g., by the controller to a file system component of the host computing device). The transmitted information is the "brief information" referred to herein, and may also itself be considered metadata associated with the compressed data. The system writes, by the host based on the transmitted information, a new entry of metadata associated with the compressed file into the journal (operation 536). That is, the file system component inserts in the journal an entry based on the metadata associated with the compressed data. The system also writes, by the SSD controller, the compressed file into the NAND flash (operation 538) (i.e., a "second storage device" such as a non-volatile storage device of the storage component). These operations enhance the performance of the host computing device by reducing a number of data transfers involved in compressing and writing of the first set of data.

If the system determines that the amount of compression gain (ratio) is not greater than the predetermined threshold (decision 532), the system writes, by the SSD controller, the uncompressed file into NAND flash (operation 542) (i.e., the "second storage device" such as the non-volatile storage device of the storage component), and the operation continues at decision 550.

The system determines whether it detects a condition which triggers compaction of the journal (decision 550). Exemplary conditions which trigger compaction of the journal may be based on the journal size, a time period, or another factor (e.g., whether a current size of the journal is greater than a predetermined size, or whether a predetermined time interval has passed). If the system does not detect a condition which triggers journal compaction (decision 550), the operation continues at decision 554, as described below. If it does detect a condition which triggers journal compaction (decision 550), the system updates the journal by replacing out-of-date versions of metadata entries associated with a file with a most recent version of a metadata entry (operation 552), and the operation continues at decision 554. If the file is not last file to be written (decision 554), the operation continues at operation 502 of FIG. 5A. If the file is the last file to be written (decision 554), the operation returns.

Exemplary Logical and Physical Domains

Figure 6A:
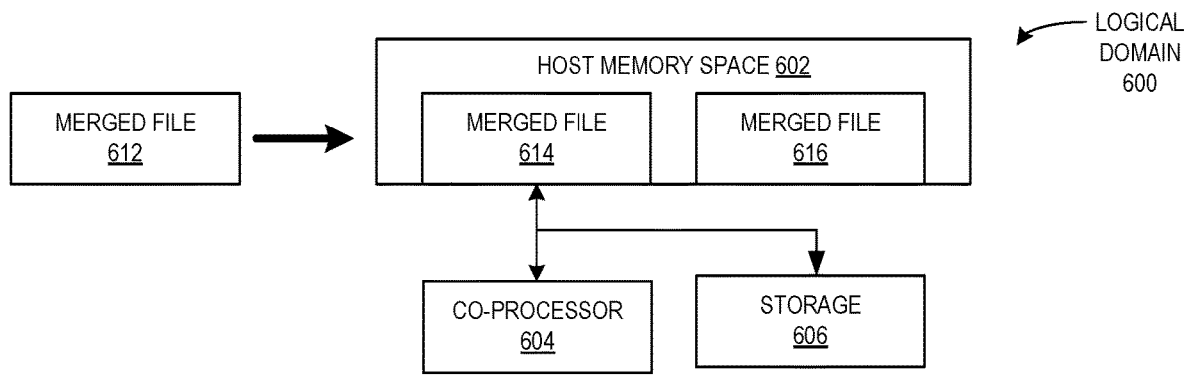
FIG. 6A illustrates an exemplary logical domain in a system that facilitates data compression with reduced data transfers, in accordance with an embodiment of the present application.

FIG. 6A illustrates an exemplary logical domain 600 in a system that facilitates data compression with reduced data transfers, in accordance with an embodiment of the present application. Logical domain 600 depicts a plurality of merged files 612 which are placed into a host memory space 602, e.g., as a merged file 614 and a merged file 616). Recall that because the system exposes the internal DRAM of the SSD to the host, host memory space 602 can include the SSD DRAM (e.g., DRAM buffer 156 of DRAM 154 of SSD 140 of FIG. 1B). A co-processor 604 can perform the compression on the merged files, as described above for the compress 174 function by microprocessor 152 of SSD controller 142 in FIG. 1B. Additionally, the compressed data can be written to a storage 606, as described above for compressed data 182 being written to NAND dies 166 in FIG. 1B.

Figure 6B:
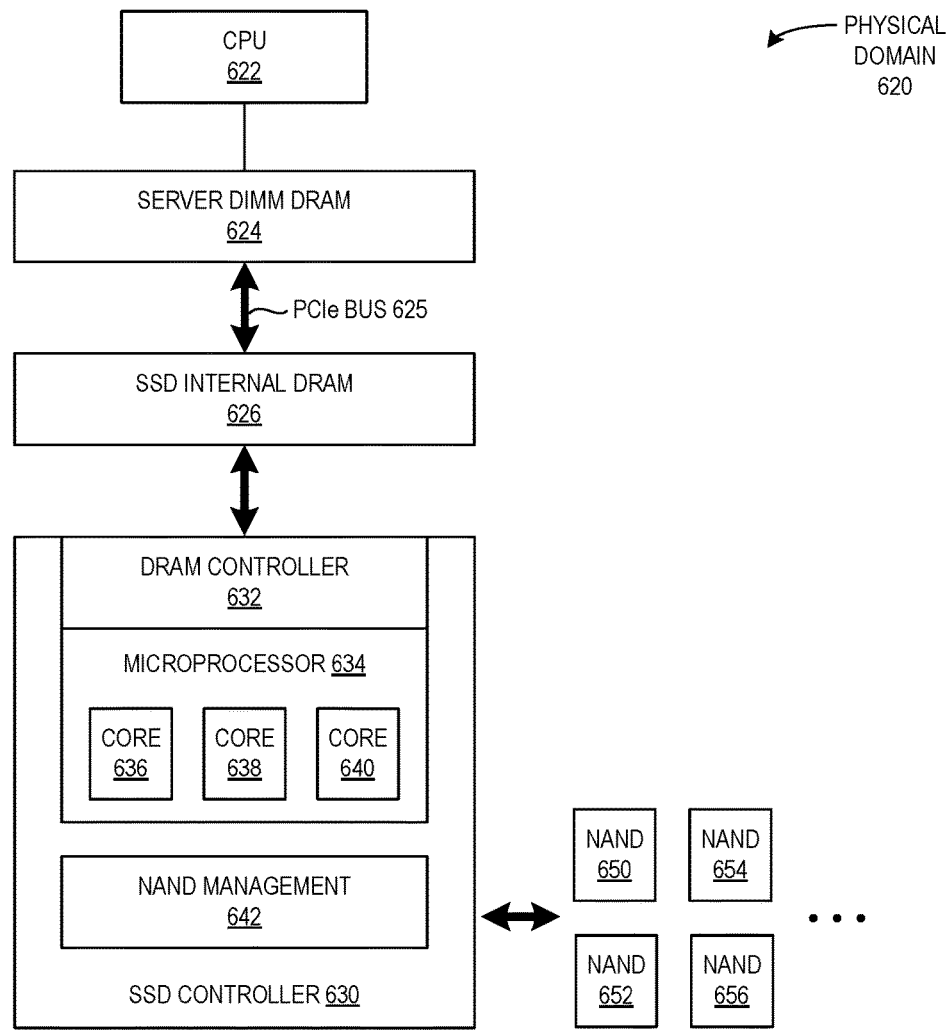
FIG. 6B illustrates an exemplary physical domain in a system that facilitates data compression with reduced data transfers, in accordance with an embodiment of the present application.

FIG. 6B illustrates an exemplary physical domain 620 in a system that facilitates data compression with reduced data transfers, in accordance with an embodiment of the present application. In physical domain 620, data (i.e., an original file which is uncompressed) can be moved to a server DIMM DRAM 624 by a CPU 622. The data can then be transferred across a PCIe bus 625 to an SSD internal DRAM 626 and received by a DRAM controller 632 of an SSD controller 630. A microprocessor 634 of SSD controller 630 can perform the compression on the original file via one or more of cores 636, 638, and 640. A NAND management 642 module can subsequently move the compressed data to NAND flash (e.g., one of NANDs 650, 652, 654, and 656). SSD controller 630 can also send back to CPU 622 the brief information or compressed metadata to be used by the file system in updating the journal log of metadata entries. These communications correspond to similar communications described above in relation to FIG. 1B.

Figure 7:
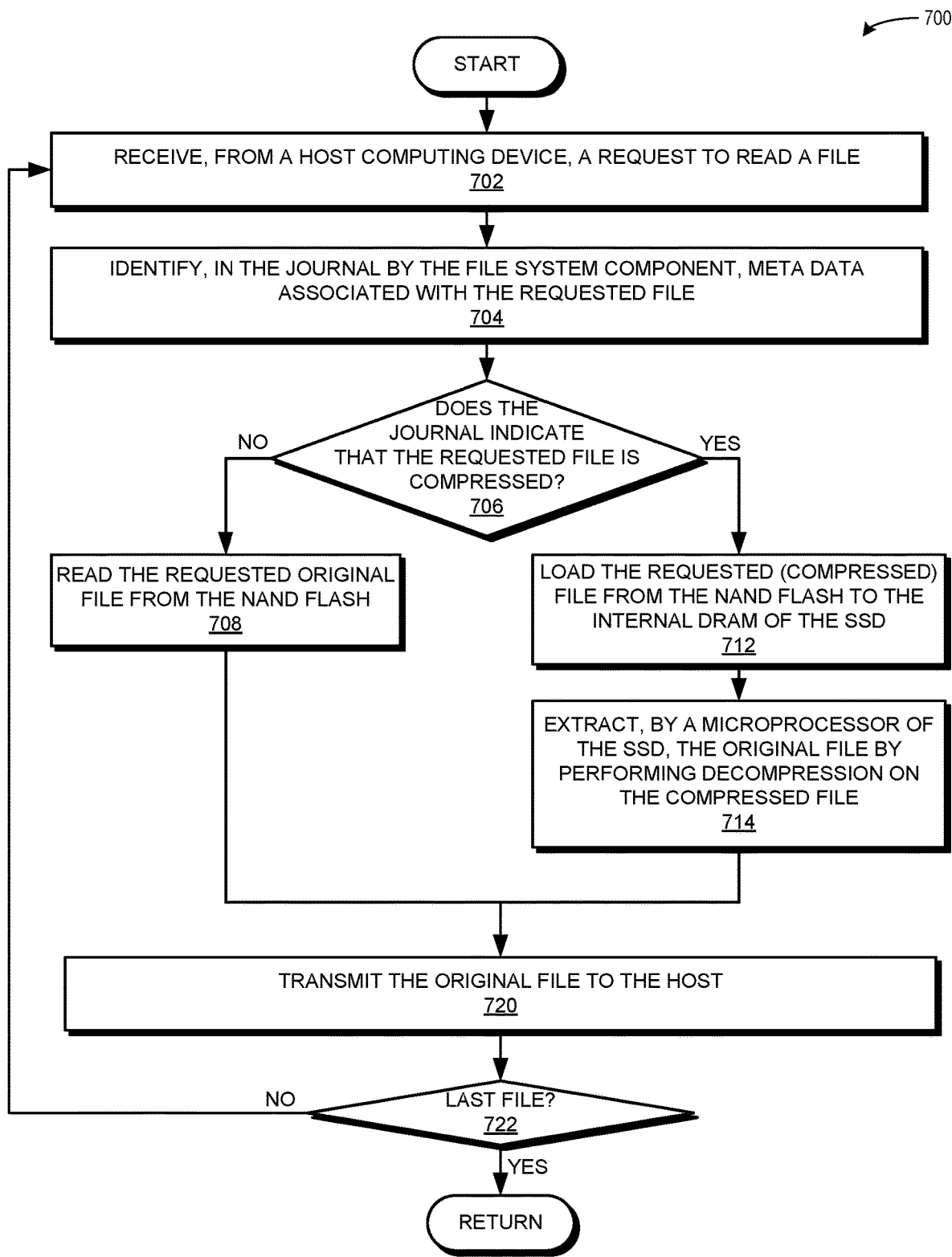
FIG. 7 presents a flowchart illustrating a method for facilitating data compression with reduced data transfers, including a read operation, in accordance with an embodiment of the present application.

Method for Facilitating Data Compression with Reduced Data Transfers: A Read Operation FIG. 7 presents a flowchart 700 illustrating a method for facilitating data compression with reduced data transfers, including a read operation, in accordance with an embodiment of the present application. During operation, the system receives, from a host computing device, a request to read a file (operation 702) (e.g., a second set of data). The system identifies, in the journal by the file system component of the host computing device, metadata associated with the requested file (operation 704) (e.g., the second set of data). If the journal indicates that the requested file is not compressed (decision 706), the system reads the requested original file (e.g., the second set of data) from the NAND flash (e.g., the "second storage device" such as the non-volatile storage device of the storage component) (operation 708).

If the journal indicates that the requested file is compressed (decision 706), the system loads the requested (compressed) file from the NAND flash to the internal DRAM of the SSD (operation 712). That is, the system loads the compressed data corresponding to the second set of data from the "second" non-volatile storage device of the storage component to the "first" volatile storage device of the storage component. The system extracts, by a microprocessor of the SSD (i.e., by the controller), the original file (e.g., the second set of data) by performing decompression on the compressed file (operation 714). Note that while flowcharts 500, 530, and 700 of, respectively, FIGS. 5A, 5B, and 7 depict the "first storage device" as a volatile storage device and further depict the "second storage device" as a non-volatile storage device, these depictions are for exemplary purposes. In some embodiments, the first and the second storage device may each be or include or comprise a volatile storage device or a non-volatile storage device.

Subsequently, the system transmits the original file to the host computing device (operation 720). If the file is not the last file to be read (decision 722), the operation continues at operation 702. If the file is the last file to be read (decision 722), the operation returns.

Exemplary Computer System and Apparatus

Figure 8:
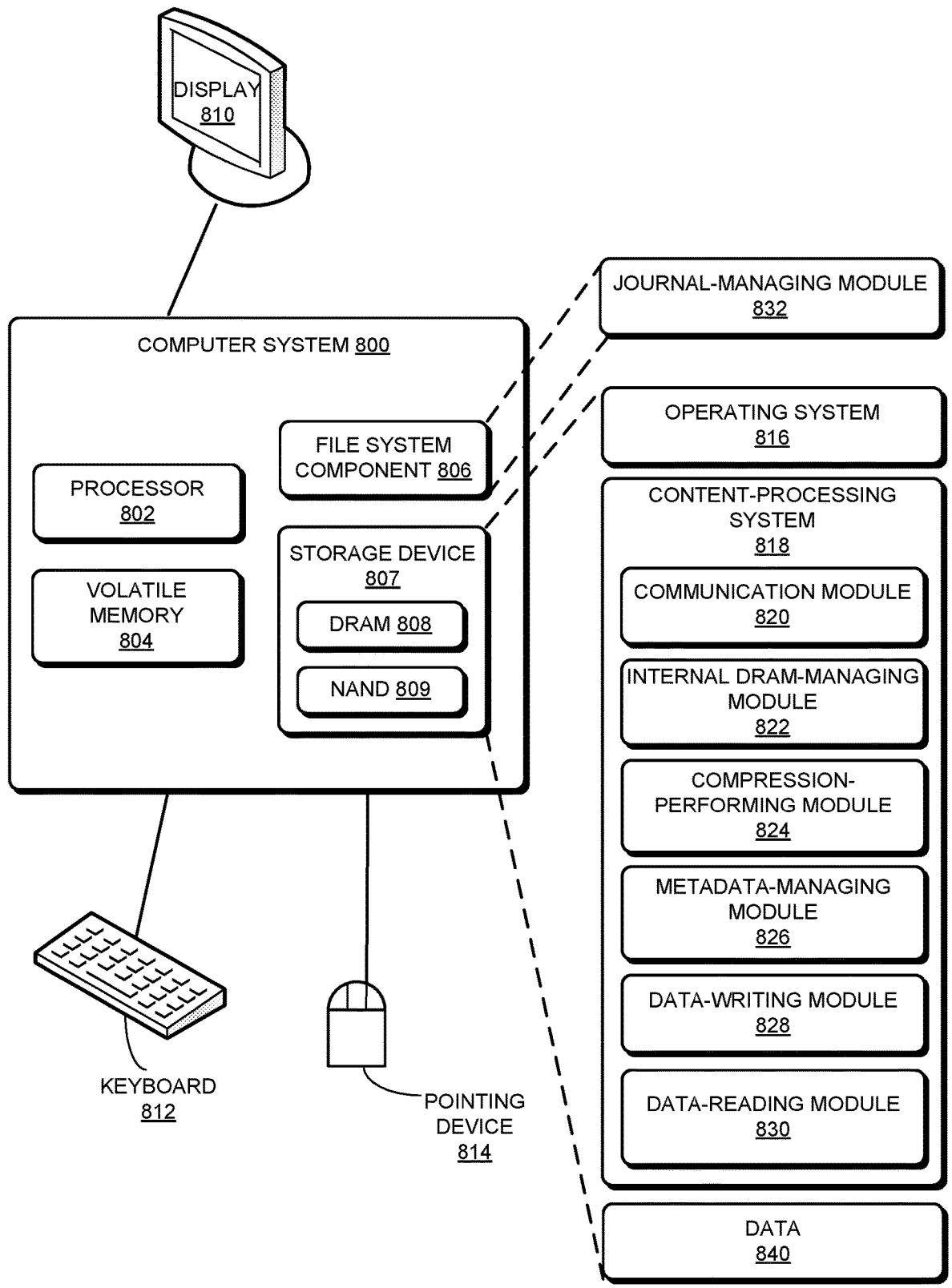
FIG. 8 illustrates an exemplary computer system that facilitates data compression with reduced data transfers, in accordance with an embodiment of the present application.

FIG. 8 illustrates an exemplary computer system 800 that facilitates data compression with reduced data transfers, in accordance with an embodiment of the present application. Computer system 800 includes a processor 802, a volatile memory 804, a file system component 806, and a storage device 807. Computer system 800 may be a host computing device, a computing device, a storage server, or a storage device. Computer system 800 may participate as a server in a distributed storage system. Volatile memory 804 can include memory (e.g., RAM) that serves as a managed memory, and can be used to store one or more memory pools. File system component 806 can be a customized file system which manages the metadata for compressed files, as discussed herein (e.g., as described above in relation to FIG. 3). Storage device 807 can include internal volatile memory (DRAM 808) and can further include non-volatile memory (NAND 809), which is used for persistent storage. Furthermore, computer system 800 can be coupled to a display device 810, a keyboard 812, and a pointing device 814. Storage device 807 can store an operating system 816, a content-processing system 818, and data 840.

Content-processing system 818 can include instructions, which when executed by computer system 800, can cause computer system 800 to perform methods and/or processes described in this disclosure. For example, content-processing system 818 can include instructions for receiving and transmitting data packets, including a request to write or read data, data to be written, compressed, decompressed, extracted, and stored, or a block or a page of data. Such instructions may be received or sent by or within components residing on a single host computing device, such as computer system 800.

Content-processing system 818 can further include instructions for receiving, by a host computing device, a request to write a first set of data (communication module 820). Content-processing system 818 can include instructions for writing the first set of data to a first storage device of a storage component (internal DRAM-managing module 822). Content-processing system 818 can include instructions for performing, by a controller of the storage component, compression on the first set of data to obtain compressed data (compression-performing module 824). Content-processing system 818 can also include instructions for transmitting, by the controller to a file system component of the host computing device, metadata associated with the compressed data (metadata-managing module 826). Content-processing system 818 can include instructions for inserting, in a journal by the file system component, an entry based on the metadata associated with the compressed data (journal-managing module 832). Content-processing system 818 can include instructions for writing, by the controller, the compressed data to a second storage device of the storage component, thereby enhancing performance of the host computing device by reducing a number of data transfers involved in compressing and writing of the first set of data (data-writing module 828).

Content-processing system 818 can additionally include instructions for, in response to detecting a condition which triggers compaction of the journal (journal-managing module 832), updating the journal by replacing out-of-date versions of metadata entries associated with a file with a most recent version of a metadata entry for the file (journal-managing module 832).

Content-processing system 818 can also include instructions for receiving, by the host computing device, a request to read a second set of data (communication module 820). Content-processing system 818 can include instructions for identifying, by the file system component in the journal, metadata associated with the second set of data (metadata-managing module 826). Content-processing system 818 can include instructions for, in response to determining, based on the identified metadata, that the second set of data is stored as compressed data (metadata-managing module 826): loading the compressed data corresponding to the second set of data from the second storage device of the storage component to the first storage device of the storage component (internal DRAM-managing module 822); and extracting, by the controller, the second set of data by performing decompression on the compressed data corresponding to the second set of data (compression-performing module 824). Content-processing system 818 can further include instructions for, in response to determining, based on the identified metadata, that the second set of data is not stored as compressed data (journal-managing module 832), reading the second set of data from the second storage device of the storage component (data-reading module 830). Content-processing system 818 can include instructions for transmitting the requested second set of data to the host computing device (communication module 820).

Data 840 can include any data that is required as input or that is generated as output by the methods and/or processes described in this disclosure. Specifically, data 840 can store at least: data to be stored, written, loaded, moved, retrieved, accessed, copied, compressed, decompressed, uncompressed, or deleted; a block of data; a page of data; a request; a request which indicates data to be read or written; a logical block address (LBA); a physical block address (PBA); uncompressed data; compressed data; metadata; an entry in a journal; a journal with entries indicating metadata associated with uncompressed or compressed data; an indicator of whether corresponding data is uncompressed or compressed; brief information; a size of data; a length of data; an offset of data; a plurality of uncompressed files; concatenated metadata for combined files; a format of concatenated metadata; an amount of compression gain; a ratio; a predetermined threshold; a predetermined size; a predetermined time interval; a condition which triggers journal compaction; a current size of the journal; a current time; decompressed data; an identifier for a non-volatile storage device of a storage component; an identifier or indicator for an internal DRAM of an SSD; a buffer; a memory buffer; and a DRAM buffer in the SSD.

Figure 9:
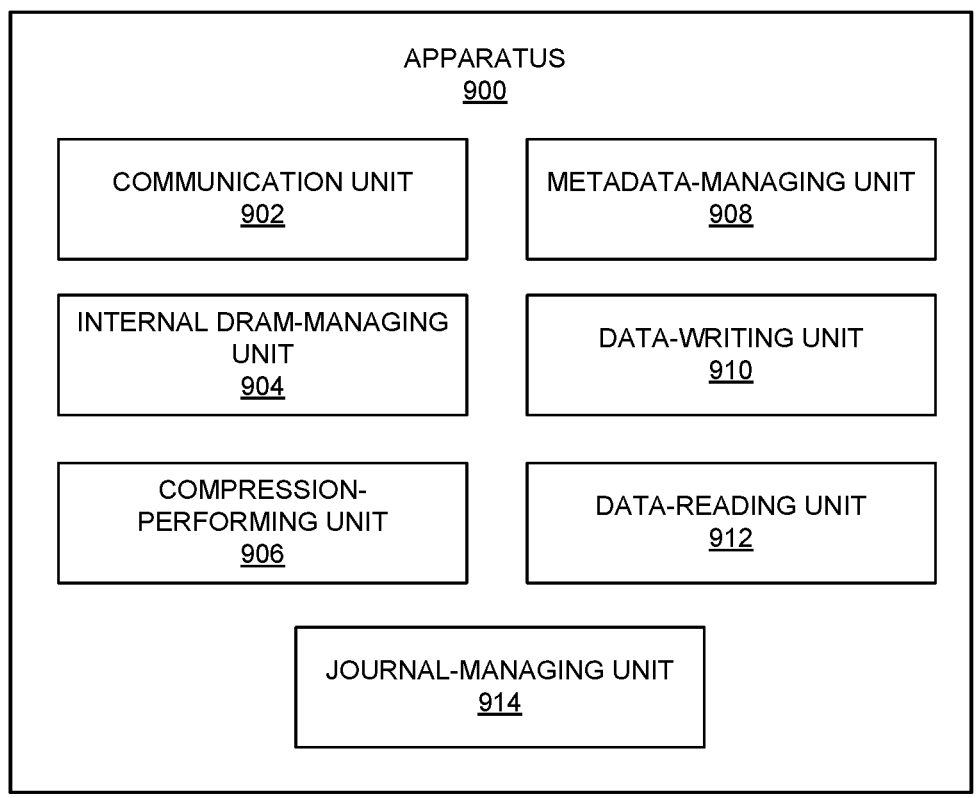
FIG. 9 illustrates an exemplary apparatus or device that facilitates data compression with reduced data transfers, in accordance with an embodiment of the present application.

FIG. 9 illustrates an exemplary apparatus or device 900 that facilitates data compression with reduced data transfers, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-914 which perform functions or operations similar to modules 820-832 of computer system 800 of FIG. 8, including: a communication unit 902; an internal DRAM-managing unit 904; a compression-performing unit 906; a metadata-managing unit 908; a data-writing unit 910; a data-reading unit 912; and a journal-managing unit 914.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating data compression, the method comprising:
   receiving, by a host computing device, a request to write a first set of data;
   writing the first set of data to a first storage device of a storage component;
   performing, by a controller of the storage component, compression on the first set of data to obtain compressed data;
   comparing metadata of the compressed data to metadata of the first set of data to determine an amount of compression gain; and
   responsive to determining that the amount of compression gain is greater than a predetermined threshold:
      transmitting, by the controller to a file system component of the host computing device, metadata associated with the compressed data;
      inserting, in a journal by the file system component, an entry based on the metadata associated with the compressed data; and
      writing, by the controller, the compressed data to a second storage device of the storage component.

2. The method of claim 1, further comprising:
   writing, by the host computing device, a plurality of uncompressed files to a volatile memory of the host computing device;
   combining, by the file system component, the plurality of uncompressed files;
   concatenating, by the file system component, metadata for the combined files;
   writing, by the file system component, the concatenated metadata in the journal based on a format of the concatenated metadata; and
   writing the uncompressed files to the first storage device of the storage component.

3. The method of claim 1, further comprising:
   in response to determining that the amount of compression gain is not greater than the predetermined threshold, writing the first set of data to the second storage device of the storage component.

4. The method of claim 1, further comprising:
   exposing the first storage device of the storage component to the host computing device, which allows the host computing device to write the first set of data or the compressed data to the first storage device of the storage component.

5. The method of claim 1, wherein in response to detecting a condition which triggers compaction of the journal, the method further comprises:
   updating the journal by replacing out-of-date versions of metadata entries associated with a file with a most recent version of a metadata entry for the file.

6. The method of claim 5, wherein the condition which triggers compaction of the journal is based on one or more of:
   whether a current size of the journal is greater than a predetermined size; and
   whether a predetermined time interval has passed.

7. The method of claim 1, further comprising:
   receiving, by the host computing device, a request to read a second set of data;
   identifying, by the file system component in the journal, metadata associated with the second set of data;
   in response to determining, based on the identified metadata, that the second set of data is stored as compressed data:
      loading the compressed data corresponding to the second set of data from the second storage device of the storage component to the first storage device of the storage component; and
      extracting, by the controller, the second set of data by performing decompression on the compressed data corresponding to the second set of data;
   in response to determining, based on the identified metadata, that the second set of data is not stored as compressed data, reading the second set of data from the second storage device of the storage component; and
   transmitting the requested second set of data to the host computing device.

8. The method of claim 1,
   wherein the storage component is a solid state drive (SSD), wherein the first storage device of the storage component is an internal volatile memory which includes a dynamic random access memory (DRAM) buffer, wherein the second storage device is a non-volatile memory, wherein the compression is performed by a microprocessor of the SSD controller, and wherein the first set of data is written to the internal DRAM buffer of the SSD via a Peripheral Component Interconnect Express (PCIe) bus.

9. A computer system for facilitating data compression, the system comprising:
   a processor; and
   a memory coupled to the processor and storing instructions, which when executed by the processor cause the processor to perform a method, the method comprising:
      receiving, by a host computing device, a request to write a first set of data;
      writing the first set of data to a first storage device of a storage component;
      performing, by a controller of the storage component, compression on the first set of data to obtain compressed data;
      comparing metadata of the compressed data to metadata of the first set of data to determine an amount of compression gain; and
      responsive to determining that the amount of compression gain is greater than a predetermined threshold:
         transmitting, by the controller to a file system component of the host computing device, metadata associated with the compressed data;
         inserting, in a journal by the file system component, an entry based on the metadata associated with the compressed data; and
         writing, by the controller, the compressed data to a second storage device of the storage component.

10. The computer system of claim 9, further comprising:
   writing, by the host computing device, a plurality of uncompressed files to a volatile memory of the host computing device;
   combining, by the file system component, the plurality of uncompressed files;
   concatenating, by the file system component, metadata for the combined files;
   writing, by the file system component, the concatenated metadata in the journal based on a format of the concatenated metadata; and
   writing the uncompressed files to the first storage device of the storage component.

11. The computer system of claim 9, wherein the method further comprises:
   in response to determining that the amount of compression gain is not greater than the predetermined threshold, writing the first set of data to the second storage device of the storage component.

12. The computer system of claim 9, wherein the method further comprises:
   exposing the first storage device of the storage component to the host computing device, which allows the host computing device to write the first set of data or the compressed data to the first storage device of the storage component.

13. The computer system of claim 9, wherein in response to detecting a condition which triggers compaction of the journal, the method further comprises:
   updating the journal by replacing out-of-date versions of metadata entries associated with a file with a most recent version of a metadata entry for the file.

14. The computer system of claim 13, wherein the condition which triggers compaction of the journal is based on one or more of:
   whether a current size of the journal is greater than a predetermined size; and
   whether a predetermined time interval has passed.

15. The computer system of claim 9, wherein the method further comprises:
   receiving, by the host computing device, a request to read a second set of data;
   identifying, by the file system component in the journal, metadata associated with the second set of data;
   in response to determining, based on the identified metadata, that the second set of data is stored as compressed data:
      loading the compressed data corresponding to the second set of data from the second storage device of the storage component to the first storage device of the storage component; and
      extracting, by the controller, the second set of data by performing decompression on the compressed data corresponding to the second set of data;
   in response to determining, based on the identified metadata, that the second set of data is not stored as compressed data, reading the second set of data from the second storage device of the storage component; and
   transmitting the requested second set of data to the host computing device.

16. The computer system of claim 9, wherein the storage component is a solid state drive (SSD), wherein the first storage device of the storage component is an internal volatile memory which includes a dynamic random access memory (DRAM) buffer, wherein the second storage device is a non-volatile memory, wherein the compression is performed by a microprocessor of the SSD controller, and wherein the first set of data is written to the internal DRAM buffer of the SSD via a Peripheral Component Interconnect Express (PCIe) bus.

17. A non-transitory computer-readable storage medium storing instructions that when executed by a computer cause the computer to perform a method, the method comprising:
   receiving, by a host computing device, a request to write a first set of data;
   writing the first set of data to a first storage device of a storage component;
   performing, by a controller of the storage component, compression on the first set of data to obtain compressed data;
   comparing metadata of the compressed data to metadata of the first set of data to determine an amount of compression gain; and
   responsive to determining that the amount of compression gain is greater than a predetermined threshold:
      transmitting, by the controller to a file system component of the host computing device, metadata associated with the compressed data;
      inserting, in a journal by the file system component, an entry based on the metadata associated with the compressed data; and
      writing, by the controller, the compressed data to a second storage device of the storage component.

18. The non-transitory computer-readable storage medium of claim 17, wherein the method further comprises:

in response to determining that the amount of compression gain is not greater than the predetermined threshold, writing the first set of data to the second storage device of the storage component.

19. The non-transitory computer-readable storage medium of claim 17, further comprising:

exposing the first storage device of the storage component to the host computing device, which allows the host computing device to write the first set of data or the compressed data to the first storage device of the storage component.

20. The non-transitory computer-readable storage medium of claim 17, wherein in response to detecting a condition which triggers compaction of the journal, the method further comprises:

updating the journal by replacing out-of-date versions of metadata entries associated with a file with a most recent version of a metadata entry for the file.

* * * * *